(12) United States Patent  (10) Patent No.: US 8,559,748 B2
Banerjee et al.  (45) Date of Patent: Oct. 15, 2013

(54) EDGE DETECTION

(75) Inventors: Serene Banerjee, Bangalore (IN); Noushath Shaffi, Bangalore (IN); Pulkit Parikh, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 104 days.

(21) Appl. No.: 13/259,232

(22) PCT Filed: Jun. 5, 2009

(86) PCT No.: PCT/IN2009/000325
§ 371 (c)(1),
(2), (4) Date: Sep. 23, 2011

(87) PCT Pub. No.: WO2010/140159
PCT Pub. Date: Dec. 9, 2010

(65) Prior Publication Data
US 2012/0093434 A1  Apr. 19, 2012

(51) Int. Cl.
*G06K 9/40* (2006.01)
*G06K 9/36* (2006.01)
(52) U.S. Cl.
USPC .......................................... 382/266; 382/286
(58) Field of Classification Search
USPC .......... 382/266, 270, 271, 272, 286, 190, 199
See application file for complete search history.

(56) References Cited

U.S. PATENT DOCUMENTS

| 5,550,638 | A | * | 8/1996 | Ikeda et al. | .................. | 358/296 |
|---|---|---|---|---|---|---|
| 6,005,683 | A | | 12/1999 | Son et al. | | |
| 6,046,828 | A | | 4/2000 | Feng et al. | | |
| 6,067,386 | A | | 5/2000 | Sheng | | |
| 6,124,950 | A | | 9/2000 | Honda | | |
| 6,621,599 | B1 | | 9/2003 | Newell | | |
| 8,351,720 | B2 | * | 1/2013 | Majewicz | ..................... | 382/237 |
| 2002/0126899 | A1 | | 9/2002 | Farrell | | |
| 2004/0037465 | A1 | | 2/2004 | Krause | | |
| 2005/0169531 | A1 | | 8/2005 | Fan | | |
| 2006/0165292 | A1 | | 7/2006 | Li | | |
| 2007/0110319 | A1 | | 5/2007 | Waytt et al. | | |

OTHER PUBLICATIONS

B. Gatos, T. Konidaris, K. Ntzios, I. Pratikakis, S. J. Perantonis, "A Segmentation-free Approach for Keyword Search in Historical Typewritten Documents", IEEE Int. Conf. on Document Analysis and Recognition, vol. 1, pp. 54-58, Seoul, Korea Aug. 2005.
F. Shafait, J. v. Beusekom, D. Keysers, T. M. Breuel, "Document Cleanup Using Page Frame Detection", Int. Journal on Document Analysis and Recognition, vol. 11, No. 22, pp. 81, Nov. 6, 2008.
G. Mattos, R. D. Lins, A. d. A. Fomiga, F. M. J. Martins, "BigBatch: A Document Processing for Clusters and Grids", Proc. ACM Symposium on Applied Computing, pp. 434-441, Ceara, Brazil, 2008.

(Continued)

*Primary Examiner* — Yon Couso

(57) ABSTRACT

An edge detection method and apparatus is disclosed. The method comprises the steps of: calculating a pixel gradient value for each of a plurality of pixels of a digital image, the pixel gradient value representing the difference of a pixel value with respect to at least one neighboring pixel; for each of a plurality of binarization threshold values, determining a corresponding edge map representing the location of pixel gradient values exceeding the binarization threshold value with respect to a side of the digital image; for each edge map, computing a measure of linearity; determining an optimal binarization threshold value based on the computed measures of linearity; and selecting the edge map corresponding to the optimal binarization threshold value.

15 Claims, 11 Drawing Sheets

(56) References Cited

OTHER PUBLICATIONS

S. D. Zenzo, "A Note on the Gradient of a Multi-image", Int. Conf. on Computer Vision, Graphics, and Image Processing, vol. 33, pp. 116-125, 1986.

S. Ramachandrula, S. Banerjee, S. Noushath, P. Parikh, A. Kuchibhotla, P. Dey, L. Amalraj and C. Y. Ker, "Real-time Embedded Skew Correction in AiOs/MFPs", Proc. HP Tech Conf Asia, Ting-Ting, China, Dec. 2-4, 2008.

* cited by examiner

EDGE DETECTION

BACKGROUND

Edge detection is important for a number of image processing and document reproduction applications, such as border removal, skew correction and for size based processing, such as auto-crop, fit-to-page, borderless printing, orientation detection etc.

When a paper document is scanned by a scanner to produce a digital image of the document, the resulting digital image is often skewed. The causes of a skewed image may be that the document was not fed properly, or that the paper transport mechanism is out of alignment. The skew of a document image produces an unpleasant effect on viewing an image. In addition, it results in additional complexities in optical character recognition, document segmentation, and document analysis.

Also, when documents or various sizes and/or thicknesses are scanned by a scanner, unwanted borders or patches (which are typically dark or white in colour) may be present at one or more edges of a document in a resulting digital image. Such borders or patches may be due to a document not matching the scanning area or a document preventing the scanner lid from being closed properly, for example, and are undesirable in a document image due to the extra data storage and/or ink requirements they create.

Effective page edge detection is a typical component of border removal and skew correction in digital images. However, detected edges can also be utilized for size-based processing of a digital document image, such as auto-crop, fit-to-page, borderless printing, and orientation detection applications.

Conventional methods for software-based or in-product page edge detection exhibit limitations in one or more of the following variations: noise of Charge-Coupled Device (CCD) sensor outputs, document content and color, scanner/copier hardware, and the way the input is read (either as a whole image or in swaths).

Also, for light documents against a light background, and dark documents against a dark background, it is challenging to detect page edges, since the statistics of the foreground and background may be similar.

BRIEF DESCRIPTION OF THE DRAWINGS

For a better understanding, embodiments will now be described, purely by way of example, with reference to the accompanying drawings, in which:

FIG. 1b shows a graphic representation of a LHS image profile for the digital image of FIG. 1a;

FIG. 2b shows a graphic representation of a LHS image profile for the digital image of FIG. 2a;

FIG. 3b shows a graphic representation of a LHS image profile for the digital image of FIG. 3a;

FIG. 6b shows a binarized version of the digital image of FIG. 5 using a lower binarization threshold value than that used to create the digital image of FIG. 6a;

FIG. 6c shows a binarized version of the gradient image of the digital image of FIG. 5 using a higher binarization threshold value than that used to create the digital image of FIG. 6a;

DETAILED DESCRIPTION

Figure 1A:
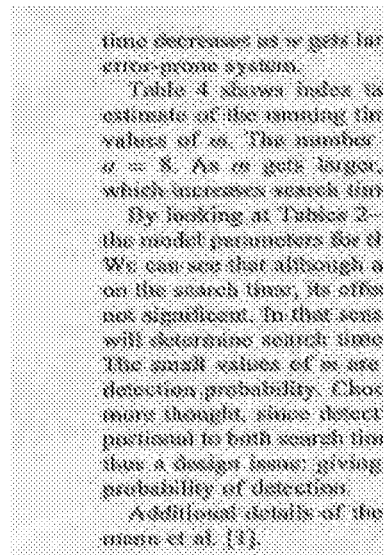
FIG. 1a shows an exemplary digital image of a printed document.

Proposed is an adaptive threshold based pre-processing approach that combines edge detection with a linearity measure to enhance and detect straight edges (such as document page edges) in the presence of noise.

According to an aspect, there is provided an edge detection method for detecting a substantially linear edge in a digital image, the method comprising the steps of: calculating a pixel gradient value for each of a plurality of pixels of a digital image, the pixel gradient value representing the difference of a pixel value with respect to at least one neighboring pixel; for each of a plurality of binarization threshold values, determining a corresponding edge map representing the location of pixel gradient values exceeding the binarization threshold value with respect to a side of the digital image; for each edge map, computing a measure of linearity; determining an optimal binarization threshold value based on the computed measures of linearity; and selecting the edge map corresponding to the optimal binarization threshold value.

According to another aspect there is provided an edge detection method for detecting a substantially linear edge in a digital image, the method comprising the steps of: for each of a plurality of binarization threshold values, determining a corresponding edge map representing the location of pixel gradient values of the digital image exceeding the binarization threshold value with respect to a side of the digital image; determining an optimal edge map based on computed measures of linearity of the determined edge maps; and detecting the substantially linear edge by identifying a substantially linear line in the selected edge map.

Embodiments enable the robust detection of one or more document page edges within a digital image. Thus, there is provided an image processing method for automatic document skew angle detection, border detection and border removal in a digital image of a document having a noisy background caused by interference of adjacent scanned pages and/or noises in a high speed production scanner, for example.

The step of preprocessing the digital image may comprise the steps of: downsampling the digital image to produce a downsampled digital image having a resolution that is lower than that of the digital image; and processing the downsampled image with a noise smoothing operator. In this way, embodiments can be of low implementation complexity, enabling them to be embedded in a scanning device or digital camera, for example.

One can introduce the concept of a 'margin profile' of a digital image. A margin profile is a one-dimensional feature vector obtainable from analyzing a digital image by viewing the image from one of its sides/edges.

A margin profile represents the location, for each row or column, of a first edge pixel in the binarized edge map of the digital image when viewed from a side of the image. For example, a left hand side (LHS) margin profile of a binarized digital image (i.e. a digital image with pixels having one of two possible pixel values) represents, for every row of the binarized digital image, the column in which a first change in pixel value between neighboring pixels occurs when traversing the row from the LHS of the binarized digital image to the right hand side (RHS) of the binarized digital image. Similarly, a top side (TS) margin profile of a binarized digital image represents, for every column of the binarized digital image, the row in which a first change in pixel value between neighboring pixels occurs when traversing the columns from the TS of the binarized digital image to the bottom side of the binarized digital image. In a similar way, it is possible to get margin profiles of the right hand side, and the bottom side of the digital image.

Figure 1B:
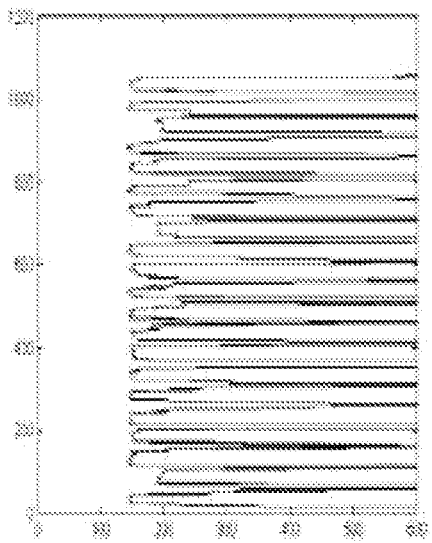

FIG. 1a shows an exemplary digital image of a printed document, and FIG. 1b shows a graphic representation of a LHS image profile for the digital image of FIG. 1a. The graphic representation shows the location of a first edge pixel for each row when viewed from the LHS of the image of FIG. 1a. FIG. 1b shows the LHS margin profile of the printed text in Figure is as being similar to a periodic square wave.

Figure 2A:
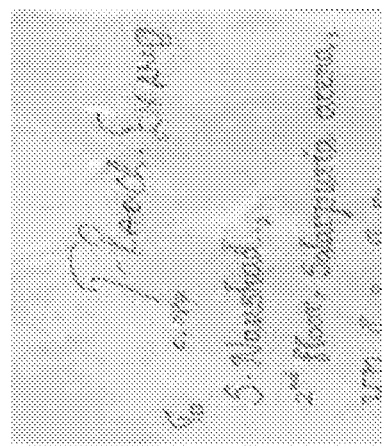
FIG. 2a shows an exemplary digital image of a hand-written document.
Figure 2B:
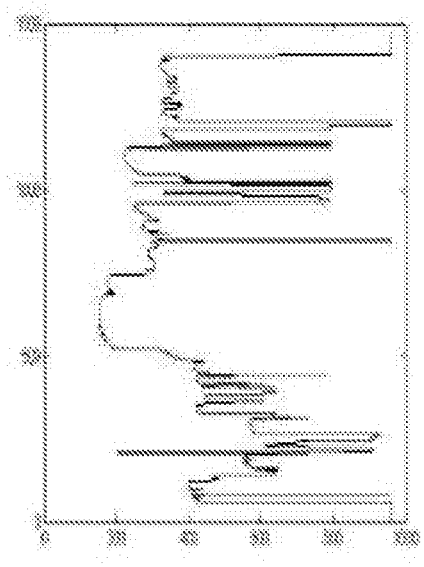

FIG. 2a shows an exemplary digital image of a handwritten document, and FIG. 2b shows a graphic representation of a LHS image profile for the digital image of FIG. 2a. The graphic representation shows the location of a first edge pixel for each row when viewed from the LHS of the image of FIG. 2a. FIG. 2b shows the LHS margin profile of the handwritten text in FIG. 2a as being similar to a randomly undulating line.

Figure 3A:
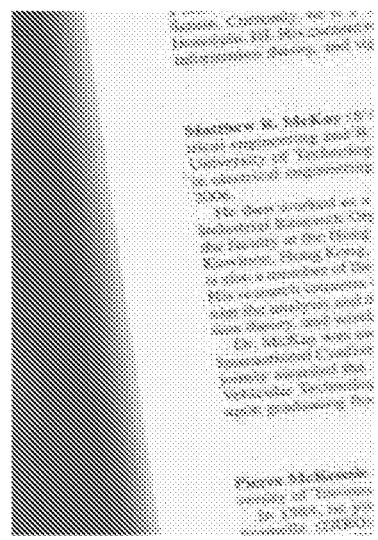
FIG. 3a shows an exemplary digital image of a skewed document page.
Figure 3B:
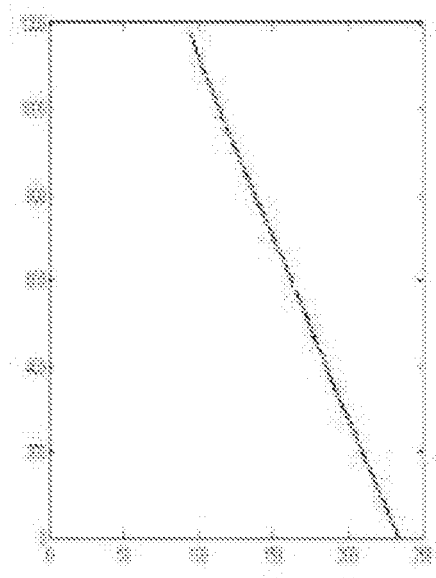

FIG. 3a shows an exemplary digital image of a skewed document page, and FIG. 3b shows a graphic representation of a LHS image profile for the digital image of FIG. 3a. The graphic representation shows the location of a first edge pixel for each row when viewed from the LHS of the image of FIG. 3a. FIG. 3b shows the LHS margin profile of the skewed document page in FIG. 2a as being a substantially straight line, with a gradient proportional to the angle by which the document is skewed from vertical.

Embodiments use the concept of margin profiles to enhance page edge detection of a scanned document which can then be used for border removal and/or skew correction. On sides where a document page edge is not present, for example when the document page extends beyond the scan bed boundary of a scanner, then the edge of the document may be drawn so that it does not affect any content. For example, if there is text extending beyond the scan bed boundary then that side remains untouched. If a small page number is close to the scan bed boundary, for example, the edge of the document is drawn so as to preserve the page number.

Figure 4:
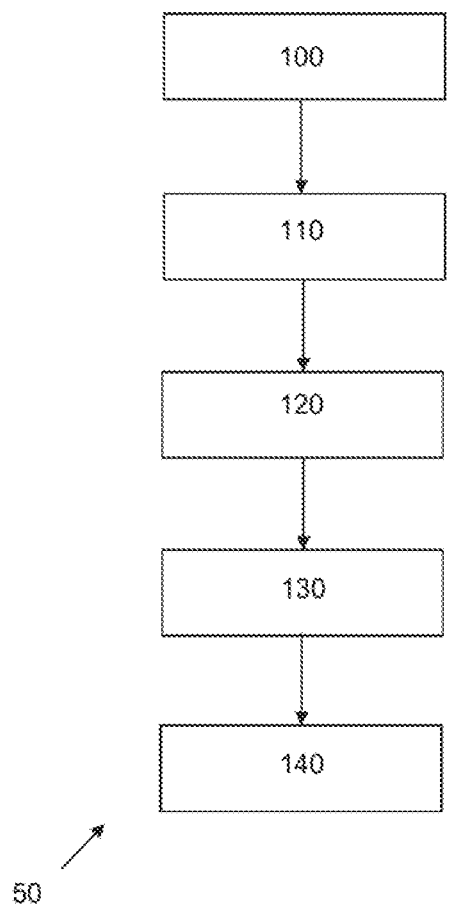
FIG. 4 is a flow diagram of a straight edge detection method according to an embodiment.

Referring now to FIG. 4, a straight edge detection method 50 according to an embodiment will now be described. As shown by the flow diagram of FIG. 4, the method comprises the steps of: (step 100) preprocessing the digital image to reduce its resolution and smooth noise, (step 110) calculating a gradient value or a change value of each pixel with respect to it's surroundings (i.e. neighboring pixels); (step 120) determining images profiles of the gradient values based on the relative location of similar gradient values; (step 130) determining a optimal binarization threshold value based on the results of the gradient values and the linearity of image profiles; and (step 140) binarizing the gradient values based on the determined optimal binarization threshold to locate the positions of one or more straight edges in the digital image. Each of the above steps 100 to 140 will now be described in more detail.

In step 100, the original digital image is down sampled to a lower resolution for complexity reduction and noise smoothing. For example, the original image may be down sampled to 10 percent (%) of its original image, but, of course, the original image may be down sampled by any suitable amount to a resolution less than its original resolution. For the purposes of this example, an original image having a resolution of 300× 300 dots per inch (dpi) is down sampled to a lower resolution image having a resolution of 100×100 dpi using an anti aliasing filter and Gaussian smoothing.

Next, in step 110, the down sampled image is processed with a Sobel edge detector to track the change of each pixel with respect to its surrounding pixels. This produces a gradient image of the down sampled image, wherein the pixel value of each pixel of the down sampled image is replaced with a gradient value (or change value) representing the change of the pixel with respect to its surrounding pixels.

The method then continues by processing the change values for each pixel as obtained by the Sobel edge detector using the concept of margin profiles to determine an optimal binarization threshold that guarantees the visibility of the page edge (steps 120 and 130). Here, this achieved by optimizing a linearity criterion for the margin profile(s).

In step 120, a linearity of image profiles of the down sampled gradient image is determined for a range of binarization values. In other words, for each binarization value in a range of binarization values, an image profile of the down sampled gradient image is determined. Experiments have shown binarization values in the range from 0 to 20, with a step size of 1, may be adequate, but this range of values can be different and can even be dynamically determined for each image based on image features or results of previous image profile determinations.

Determination of an image profile for each binarization value in a range of binarization values may be repeated with respect to different sides of the gradient image. In this way, a range of image profiles may be determined with respect to one side of the gradient image, and one or more further ranges of image profiles may be determined for one or more other remaining sides of the gradient image.

Choosing an appropriate optimal binarization threshold value can have important implications for ensuring accurate edge detection.

Turning to FIGS. 5, 6a, 6b and 6c, it can be seen how the value determined for the optimal binarization threshold value can affect the result of a straight edge detection method according to an embodiment.

Figure 5:
FIG. 5 shows an original digital image of a dark document having a dark background.
Figure 6A:
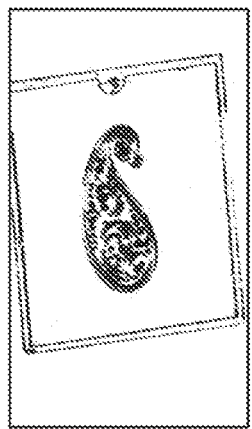
FIG. 6a shows a binarized version of the digital image of FIG. 5 using an optimal binarization threshold value in accordance with an embodiment.
Figure 6B:
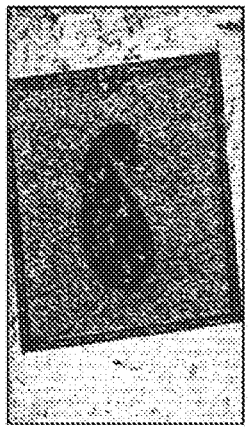
Figure 6C:
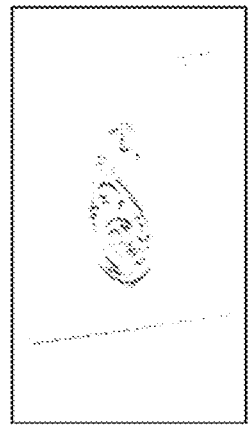

FIG. 5 shows an original digital image of a dark document having a dark background. FIG. 6a shows a binarized version of the digital image of FIG. 5 using an optimal binarization threshold value. FIG. 6b shows a binarized version of the gradient image of the digital image of FIG. 5 using a lower binarization threshold value than that of FIG. 6a. FIG. 6c shows a binarized version of the digital image of FIG. 5 using a higher binarization threshold value than that of FIG. 6a.

From FIGS. 6a to 6c is can be seen that use of an optimal binarization value produces a binarised image having well-defined edges, whereas use of a binarization value which is too low or too high, produces a binarised image containing lots of noise or little content, respectively.

As mentioned above, determination of the optimal binarization threshold value may be based on optimizing a linearity criterion for the determined margin profiles. As a linearity measure one can use the criteria that when a line is linear, the standard deviation of the intercepts at equidistant points from their mean value is a minimum. For example, for the top side (TS) margin, one obtains the y- or row-intercepts of points that are five pixels apart along the x-direction or columns. The mean of the y-intercepts is computed by averaging the y-intercepts. The linearity measure is the sum of squared errors of the difference of the individual y-intercepts from the mean y-intercept. The more linear the line is, the less is the sum of the squared errors. The same method as above for calculating a linearity measure is used for the bottom side margin. For the left and the right side margin, one obtains the x- or column-intercepts of points that are five pixels apart along the y-direction or rows. The mean of the x-intercepts is computed by averaging the x-intercepts. The linearity measure is calculated as the sum of squared errors of the difference of the individual x-intercepts from the mean x-intercept.

Figure 7:
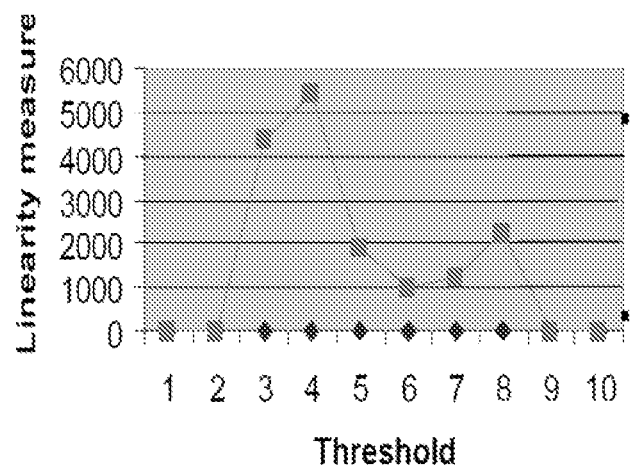
FIG. 7 is an exemplary graph of a linearity measure of margin profiles against the corresponding binarization value used to create each margin profile.

Turning to FIG. 7, a plot of the linearity measure of margin profiles against the corresponding binarization value is used to determine the optimal threshold at which the gradient image has to be binarized in order to detect a straight edge. It has to be noted, that for this plot (as based on the criteria mentioned above), a lower value of the linearity measure indicates that the points are more linear and a higher value indicates that the points are less linear. As has been seen from FIG. 6b, scan bed noise can lead to long and connected lines which correspond to the first minimum of the linearity measure plot. Thus, initially, the linearity measure vs. quantization plot shows a (first) local minimum (for binarisation value "six" (6) in FIG. 7) that corresponds to detecting the scan bed noise. As the binarization threshold value then increases further, the linearity increases to a local maximum before subsequently reaching a (second) local minimum that corresponds to detecting the linearity of the document page edge. Thus, for the plot of FIG. 7, it determined that the value for the optimal binarisation threshold is "nine" (9). This value for the optimal binarization threshold ensures that a long connected component or document page edge is visible in the binarised digital image (as illustrated in FIG. 6a).

Thus, from above, it will be appreciated that the step 130 of determining an optimal binarization threshold value comprises: for each image profile of the gradient image, computing a measure of linearity of gradient values; and selecting a binarization threshold value corresponding to a second minimum in a graph of linearity versus threshold value as the optimal binarization threshold value.

Using the optimal binarization threshold, the gradient image is binarized in step 140 so as to detect a document page edge in the gradient image. The pixel positions of the detected page edge in the binarized gradient image determine the location of the page edge in the digital image, for example.

The above approach uses only margin profiles determined with respect to one side of the digital image, so as to reduce save computational complexity. Where more computational cycles are available, or where swath based implementation is not necessary, the margin profiles can be determined with respect to more than one side of the digital image and subsequently used for threshold value optimization.

As both the intensity of the edge detected output and the relative locations of similar pixels are considered for determining an optimal threshold value, the proposed approach can detect document page edges accurately in cases where scan bed noise is absent.

Figure 8:
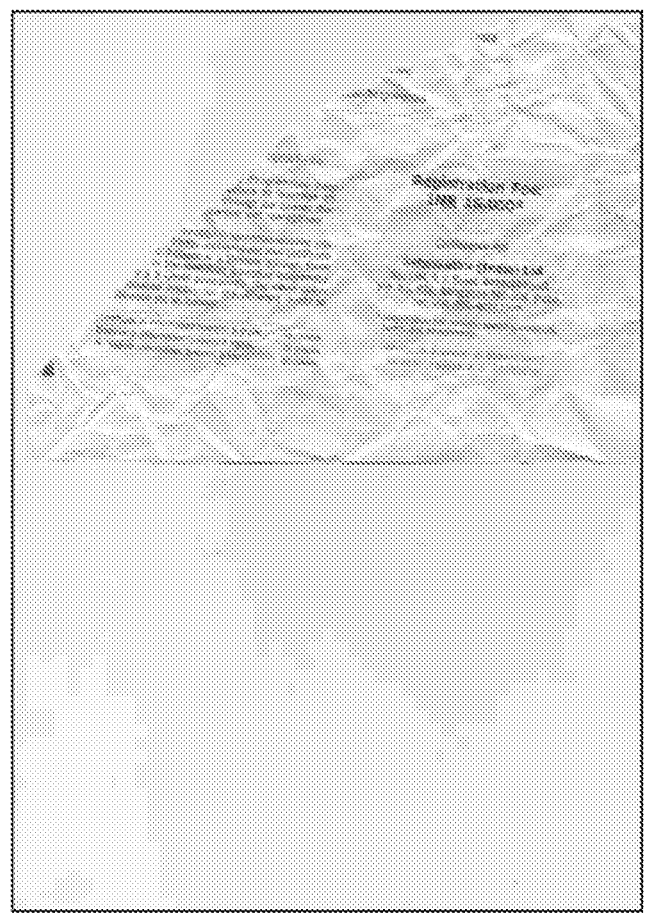
FIG. 8 shows an input digital image obtained by a scanner, wherein the document has a light background scanned and the scanner lid was closed.

For example, when a scan bed of a scanner is closed (i.e. when the scan bed background is light) and a document with light background is scanned, the proposed method is still able to detect the page edge accurately. FIG. 8 shows an input digital image obtained from a document with light background being scanned with the scanner lid closed.

Figure 9:
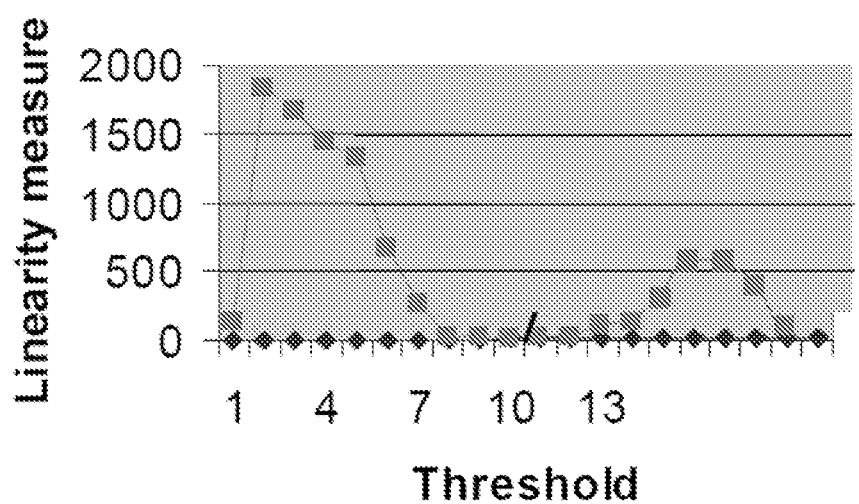
FIG. 9 is another exemplary graph of a linearity measure versus binarization threshold.

Further, FIG. 9 shows the linearity versus threshold plots used to determine the optimal threshold value. As before, it is seen that the optimal threshold value corresponds to a second local minimum of the linearity measure versus threshold plot.

It has been shown that the proposed preprocessing step enables visibility of the page edge irrespective of document background (i.e. light or dark documents on light or dark backgrounds, respectively), noise, lighting or CCD sensor output variations. This may be due to the following reasons:

The proposed marginal profile based adaptive binarization increases the likelihood of the visibility of document edges, as both the intensity of the edge detected output and the relative location of similar pixels are considered for selecting the appropriate binarization threshold. This would not have been possible if any histogram based threshold is chosen.

As the threshold selection depends on each document image and scanner background combination, no device dependent tuning is required.

The proposed approach is of low complexity as the appropriate threshold is chosen by only one pass of the edge detected output. Further, for each threshold, along each of the margins, the location when the pixel value just exceeds the threshold may be stored. This position can then be used to start the scan for the next threshold. At the appropriate threshold, the linearity criteria for these pixel locations reach the second minimum.

Page Edge Detection

An observation here is that if a given set of points contains a continuous linear segment of a satisfactorily large size, it is likely to be a page edge. For example, if a continuous linear segment is larger than 30% of the length of a side of the image, if may be judged to be a page edge. The value of 30% has been found to be suitable since user studies have shown that while scanning A4 sized documents it is likely that at least 30% of the page still physically is within the scanner bed if the document is skewed from placement. This threshold value can however be adapted depending on how much of the page edge lies physically inside the scanner bed for normal scanning applications.

One can scan through all the points, maintaining connected segments along the way. For each connected segment beyond a certain threshold size (for example, 3% of the length of a side of an image), a check for a measure of linearity can be made (for example, the standard deviation of the orientation angles of the lines formed by joining all points with the mean point can be calculated). Of course, other threshold size values may be used, such as 1%, 5% or 10% of the length of a side of an image for example.

It is worth noting that, due to the presence of small noise particles, a big linear segment may be broken up into segments which do not pass the length criterion (i.e. each of the segments are not long enough). To circumvent this, a check can be made to see if the current segment and the previous segment fall on the same line. This may be done by checking the standard deviation of the orientation angles of the lines formed by joining all points in a first set with the mean point of a second set and vice versa. A variable that keeps track of the size of the largest linear segment may be maintained. When the current segment is linear with its linear predecessor, which is not too distant, the length of the current segment may be added to this variable. Once this has exceeded a predetermined threshold, the module may then terminate.

By way of illustrating an exemplary application, a detected page edge can be used to carry out frame removal. To illustrate how one can use embodiments of the proposed method for removing borders or frames from a digital image of a scanned document, the following description is provided.

Once a page edge is detected, if only border removal is required, the detected page edge is arranged to serve as a boundary. If both skew correction and border removal are required, a more accurate frame boundary may be determined as follows.

Skew Estimation

Representative skew angles can be detected from the four sides of the document image by applying a known skew detection algorithm. Numerous skew detection algorithms will be known to the skilled reader, and so detailed description of potential skew detection algorithms is not provided here.

Once an appropriate value for skew is determined, the skew angle can be utilized to detect the border boundary.

Border Boundary Estimation

Figure 10:
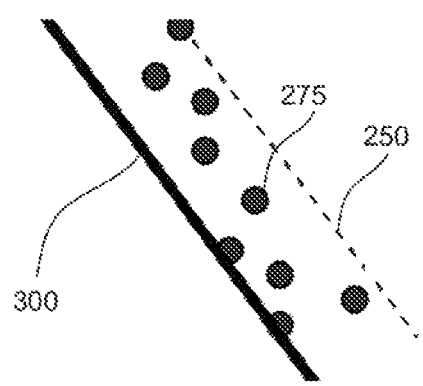
FIG. 10 illustrates border boundary estimation according to an embodiment.

A border boundary is the straight line that effectively separates scan bed noise and document content. For a y=mx+c representation of a straight line, the gradient 'm' is tangential to the skew angle. For a LHS margin, a process to find this line will now be elaborated upon with reference to FIG. 10. First, one can draw a initial estimate straight line 250 using (x(0), y(0)) as an assumed valid point on the line. For each of the remaining points 275 it is determined how far apart is a point (x(i)) from a corresponding point on the initial estimate line 250 (y(i)−c/m). A final line 300 is then chosen to pass through the point that is farthest distance away from the initial line, thereby ensuring content retention.

Small Content and Noise Separation

If a document page is positioned so that it extends outside of the scan bed boundary, the page edge detection method may be arranged to detect long content edges. In this way, the removal of smaller artifacts, like handwritten annotations and page numbers, may be avoided.

To distinguish between small content beyond longer content edges and any left over scan bed noise, a possibility is the application of a local two-dimensional connected component analysis to distinguish between leftover noise and small content based on the size.

For example, an 8.5×11 inch page at 300 dots per pixel (dpi) resolution is an image of 2550×3300 pixels. For this image, investigations have shown that page numbers or small document artifacts are around 70 pixels, and left over speckle noise from the scan bed is less that 70 pixels. So, 70 pixels has been determined as a suitable threshold value for distinguishing between noise and small content. This value could, however, be adapted based upon the image resolution, page size, and/or font size, for example.

Smaller content will generally be of larger size than remaining noise. An alternative possibility may be the detection of areas in the document which contributed to the correct skew (based on content margin or content itself), and the use of these areas to predict the background color. Small content will generally have the same background color as the document background color, whereas background noise will generally be different compared to the document background, thereby distinguishing smaller content and noise.

Figure 11:
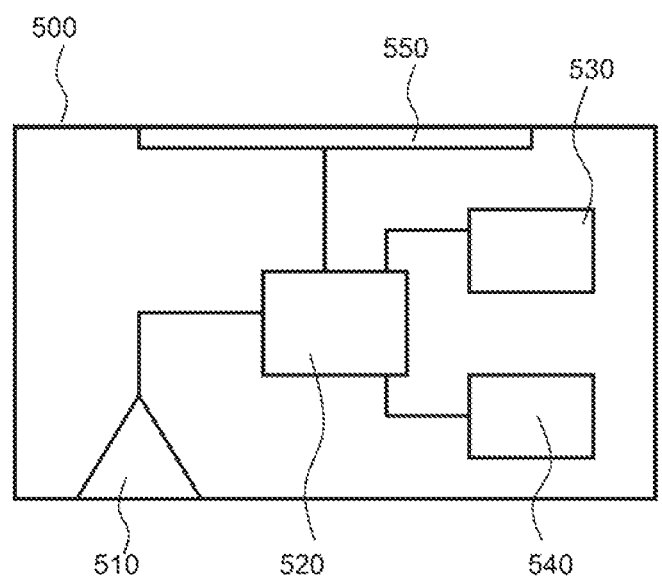
FIG. 11 is a simplified block diagram of a digital image capturing device according to an embodiment.

FIG. 11 shows a digital image capturing device 500, such as a digital camera, in accordance with an embodiment. The device 500 has an optical lens arrangement 510 connected to a central processing unit (CPU) 520. The optical lens arrangement 510 is arranged to capture light and to convert the captured light into a digital image using the CPU 520. The CPU 520 is also connected to data storage means 530 (e.g. a RAM or ROM memory, a hard-disk, and so on) integrated into the device 500 and for storing data such as digital images. The CPU 520 also has access to a further data storage device 540 integrated into the device, e.g. a RAM or ROM memory, a hard-disk, and so on, which comprises a computer program product implementing a method according to an embodiment. The CPU is suitable to execute the computer program product implementing a method in accordance with an embodiment so as to perform edge detection on a digital image captured by the optical lens arrangement 510 and/or stored in the data storage means 530.

The device 500 also has a visual display unit (VDU) 550 for displaying one or more digital images to user of the device. Thus, digital images which have been processed by the CPU using a method in accordance with an embodiment can be displayed to the user via the VDU 550.

From the above description, it will be appreciated that an exemplary pseudo code for a method of border removal from a digital image may be provided as follows:

```
for each image begin
    downsample and smooth original image to a lower resolution image
    using an anti aliasing and a Gaussian filter;
    preprocess image to maximize probability of visibility of page edge;
        for each margin;
            for each threshold value from 0 to 20;
                get margin profile of that margin for that threshold;
                compute a measure of linearity for that threshold;
            end
            select optimimal threshold for that margin where linearity vs.
            threshold plot attains second minimum;
        end
    select optimal threshold for the whole image based on the threshold
    values of the four margins, so that all the four sides are linear;
    detect page edge by checking continuity and length and
    straightness of the connected segment;
        if segment is discontinuous at any place;
            check size of next connected component;
            if size <= certain threshold;
                mark component as noise;
            else
                mark component as part of content;
            end
        end
    Find skew utilizing detected page edge, content edge (if page edge
    is not available), or using content;
    Draw frame boundary;
    for each margin;
        Draw straight line with skew angle and first point as
        reference;
        for each of the other points;
            Measure how far apart the point is from the initially
            drawn straight line;
        end
        Select point that is farthest away from the straight line;
        Redraw frame boundary with that point and the skew angle;
    end
end
```

The proposed approach was tested on a database of thirty seven (37) representative images, having substantial variations in text, graphics, thickness, folds, and size. Border removal was determined to be successful if the page edges were properly detected from all the four sides of the document, and the border was properly removed based on a subjective evaluation. Border removal using the proposed method was found to outperform conventional methods, with the proposed method being successful for images where conventional methods were unsuccessful.

For a device (HPTM AiO with an ST 231 digital signal processor) with an embodiment embedded therein, combined frame removal and skew detection took less than 1 second per image. Conventional 'flood-fill' based frame removal failed on 18 of the test images, and frame removal failed on almost all of the test images on a conventional device manufactured by Canon™ (DR4010c). Thus, it will be appreciated that page edge detection as proposed is robust and accurate, even in the case of noisy digital images.

Thus, embodiments provide a method for robust and accurate edge detection that is resilient to all possible kinds of variations, and such embodiments require no machine dependent tuning or hardware modifications. Also, detected page edges and the document skew can utilized for robust frame removal in addition to several other applications. Embodiments are also of low implementation complexity, enabling them to be embedded in scanning devices and digital imaging device such as digital still cameras.

Proposed embodiments are amenable to swath based implementation for the detection of page edges or borders in incoming swaths of a digital image without needing the whole image and for removing frames in output swaths without needing to load the whole image prior to removal.

Document page edges can even be detected for light or dark documents on light or dark backgrounds, respectively.

This disclosure proposes a frame removal algorithm based on a robust edge detection method that is able to detect page edges irrespective of the document and scan bed background variations, scanner/copier noise and lighting variations, and CCD sensor output variations.

Since, the proposed algorithm does not require any machine dependent tuning and so works across scanning devices. Also, the proposed algorithm does not require any storage of scan bed background templates, or extra pre-scans.

The proposed algorithm is of low implementation complexity and has low memory overhead, and hence is amenable to be embedded implementation on the device.

The proposed algorithm is amenable to swath based implementation relevant for automatic document feeder (ADF) scanning devices.

While specific embodiments have been described herein for purposes of illustration, various modifications will be apparent to a person skilled in the art and may be made without departing from the scope of the invention.

What is claimed is:

1. An edge detection method for detecting a substantially linear edge in a digital image, the method comprising the steps of:
calculating a pixel gradient value, at a processor, for each of a plurality of pixels of a digital image, the pixel gradient value representing the difference of a pixel value with respect to at least one neighbouring pixel;
for each of a plurality of binarization threshold values, determining a corresponding edge map, at said processor, representing the location of pixel gradient values exceeding the binarization threshold value with respect to a side of the digital image;
for each edge map, computing a measure of linearity, at said processor;
determining an optimal binarization threshold value, at said processor, based on the computed measures of linearity; and
selecting the edge map, at said processor, corresponding to the optimal binarization threshold value.

2. The method of claim 1, further comprising the steps of:
prior to the step of calculating pixel gradient values, preprocessing the digital image to down sample the digital image to produce a downsampled digital image having a resolution that is lower than that of the digital image; and
smoothing the downsampled digital image to reduce noise.

3. The method of claim 1, wherein the step of determining edge maps comprises, for each of a plurality of sides of the digital image, determining an edge map for each of a plurality of binarization threshold values representing the location of pixel gradient values exceeding the binarization threshold value with respect to the side of the digital image.

4. The method of claim 1, wherein the step of determining a plurality of edge maps comprises, for each of a plurality of binarization threshold values, determining a corresponding edge map by undertaking the steps of:
converting pixel gradient values to one of two values based on a comparison of the pixel value with the binarization threshold value so as to generate a binarised gradient image; and
for each row or column of the binarised gradient image, determining the location, with respect to a side of the image, of the first change in pixel value between neighbouring pixels.

5. The method of claim 1, wherein the step of determining an optimal binarization threshold value comprises selecting a binarization threshold value corresponding to a second minimum in a graph of edge map linearity versus binarization threshold value as the optimal binarization threshold value.

6. A method for detecting a page edge in a digital image comprising the steps of:
performing the edge detection method of claim 1; and
detecting the page edge by identifying the location of a substantially linear line in the selected edge map.

7. The method of claim 6, further comprising the steps of:
differentiating between small content and noise beyond the detected page edge using a threshold comparison test; and
defining a page boundary so that small content identified by the differentiating step is within the document page defined by the page boundary.

8. The method of claim 6, further comprising the step of processing the digital image so that an area beyond the detected page edge is colored with a background color.

9. Edge detection apparatus for detecting an edge of a page in a digital image, the apparatus comprising:
processing means adapted to calculate a pixel gradient value for each of a plurality of pixels of a digital image, the pixel gradient value representing the difference of a pixel value with respect to at least one neighbouring pixel;
edge map calculation means adapted to determine, for each of a plurality of binarization threshold values, a corresponding edge map representing the location of pixel gradient values exceeding the binarization threshold value with respect to a side of the digital image;
linearity calculation means adapted to compute a measure of linearity for each edge map;
threshold determination means adapted to determine an optimal binarization threshold value based on the computed measures of linearity; and
edge map selection means adapted to select the edge map corresponding to the optimal binarization threshold value.

10. The apparatus of claim 9, further comprising preprocessing means adapted to preprocess the digital image to down sample the digital image so as to produce a downsampled digital image having a resolution that is lower than that of the digital image, and to smooth the downsampled digital image so as to reduce noise.

11. The apparatus of claim 9, wherein the threshold determination means are adapted to select a binarization threshold value corresponding to a second minimum in a graph of edge map linearity versus binarization threshold value as the optimal binarization threshold value.

12. The apparatus of claim 9, further comprising page edge detection means adapted to detect the page edge by identifying the location of a substantially linear line in the selected edge map.

13. A non-transitory computer-readable medium, when executed on a computer, execute the steps of:
   calculating a pixel gradient value for each of a plurality of pixels of a digital image, the pixel gradient value representing the difference of a pixel value with respect to at least one neighbouring pixel;
   for each of a plurality of binarization threshold values, determining a corresponding edge map representing the location of pixel gradient values exceeding the binarization threshold value with respect to a side of the digital image;
   for each edge map, computing a measure of linearity;
   determining an optimal binarization threshold value based on the computed measures of linearity; and
   selecting the edge map corresponding to the optimal binarization threshold value.

14. A computer-readable data storage medium comprising the computer program product of claim 13.

15. A system comprising:
   data storage means for storing information;
   a computer program memory comprising the computer program product of claim 13; and
   a data processor having access the computer program memory and the data storage means, the data processor being arranged to execute said computer program product.

* * * * *